US012739027B2

(12) United States Patent
Zhu

(10) Patent No.: US 12,739,027 B2
(45) Date of Patent: Sep. 15, 2026

(54) METHOD FOR SENDING CONFIGURATION INFORMATION, AND METHOD FOR RECEIVING CONFIGURATION INFORMATION

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 256 days.

(21) Appl. No.: 18/573,373

(22) PCT Filed: Jun. 25, 2021

(86) PCT No.: PCT/CN2021/102545

§ 371 (c)(1),
(2) Date: Dec. 21, 2023

(87) PCT Pub. No.: WO2022/267060

PCT Pub. Date: Dec. 29, 2022

(65) Prior Publication Data

US 2024/0291556 A1 Aug. 29, 2024

(51) Int. Cl.

*H04W 72/0453* (2023.01)
*H04B 7/185* (2006.01)
*H04W 84/06* (2009.01)

(52) U.S. Cl.

CPC ..... *H04B 7/18539* (2013.01); *H04B 7/18589* (2013.01); *H04W 72/0453* (2013.01); *H04W 84/06* (2013.01)

(58) Field of Classification Search

CPC ........... H04B 7/18539; H04B 7/18589; H04W 72/0453; H04W 84/06

See application file for complete search history.

(56) References Cited

U.S. PATENT DOCUMENTS

2018/0241464 A1* 8/2018 Michaels ........... H04B 7/18539
2020/0244348 A1 7/2020 Cappaert et al.
(Continued)

FOREIGN PATENT DOCUMENTS

CN 110753358 A 2/2020
CN 112584412 A 3/2021
(Continued)

OTHER PUBLICATIONS

Apple "Discussions on Other Aspects of NR NTN" 3GPP TSG RAN WG1 #105-e, R1-2105104, May 2021, 5 pages.
(Continued)

*Primary Examiner* — Ayman A Abaza
*Assistant Examiner* — Van Ta Nguyen
(74) *Attorney, Agent, or Firm* — Cozen O'Connor

(57) ABSTRACT

A method for sending configuration information is performed by a base station and includes sending the configuration information to a terminal. The configuration information indicates a configuration of a plurality of beams, and the plurality of beams are used for a satellite to communicate with the terminal. A method for receiving configuration information is performed by a terminal and includes receiving the configuration information sent by a base station. The method also includes determining a configuration of a plurality of beams based on the configuration information.

18 Claims, 4 Drawing Sheets sending the configuration information to a terminal, wherein the configuration information is configured to indicate a configuration of a plurality of beams in a case that a satellite communicates with the terminal via the plurality of beams — S101 receiving request information sent by the terminal, wherein the terminal sends the request information to the base station in a case that a relationship between transmission durations corresponding to individual beams in a process of transmitting a signal from the satellite to the terminal satisfies a preset relationship — S201 sending update information for updating the timing offset information to the terminal — S202

(56) References Cited

U.S. PATENT DOCUMENTS

| | | | | |
|---|---|---|---|---|
| 2021/0392597 | A1 * | 12/2021 | Xu | H04W 56/00 |
| 2022/0149922 | A1 * | 5/2022 | Wang | H04W 76/19 |

FOREIGN PATENT DOCUMENTS

| | | | |
|---|---|---|---|
| CN | 112889227 | A | 6/2021 |
| CN | 112889227 | A1 | 6/2021 |

OTHER PUBLICATIONS

Ericsson "Feature lead summary#3 on timing relationship enhancements" 3GPP TSG-RAN WG1 Meeting #104-bis-e, R1-2103914, Apr. 2021, 64 pages.
European Patent Application No. 21946550.7, Search and Opinion dated Feb. 10, 2025, 10 pages.
PCT/CN2021/102545, International Search Report dated Feb. 25, 2022, 2 pages.
Indian Patent Application No. 202447001709 Office Action dated Feb. 5, 2026, 8 pages.

* cited by examiner

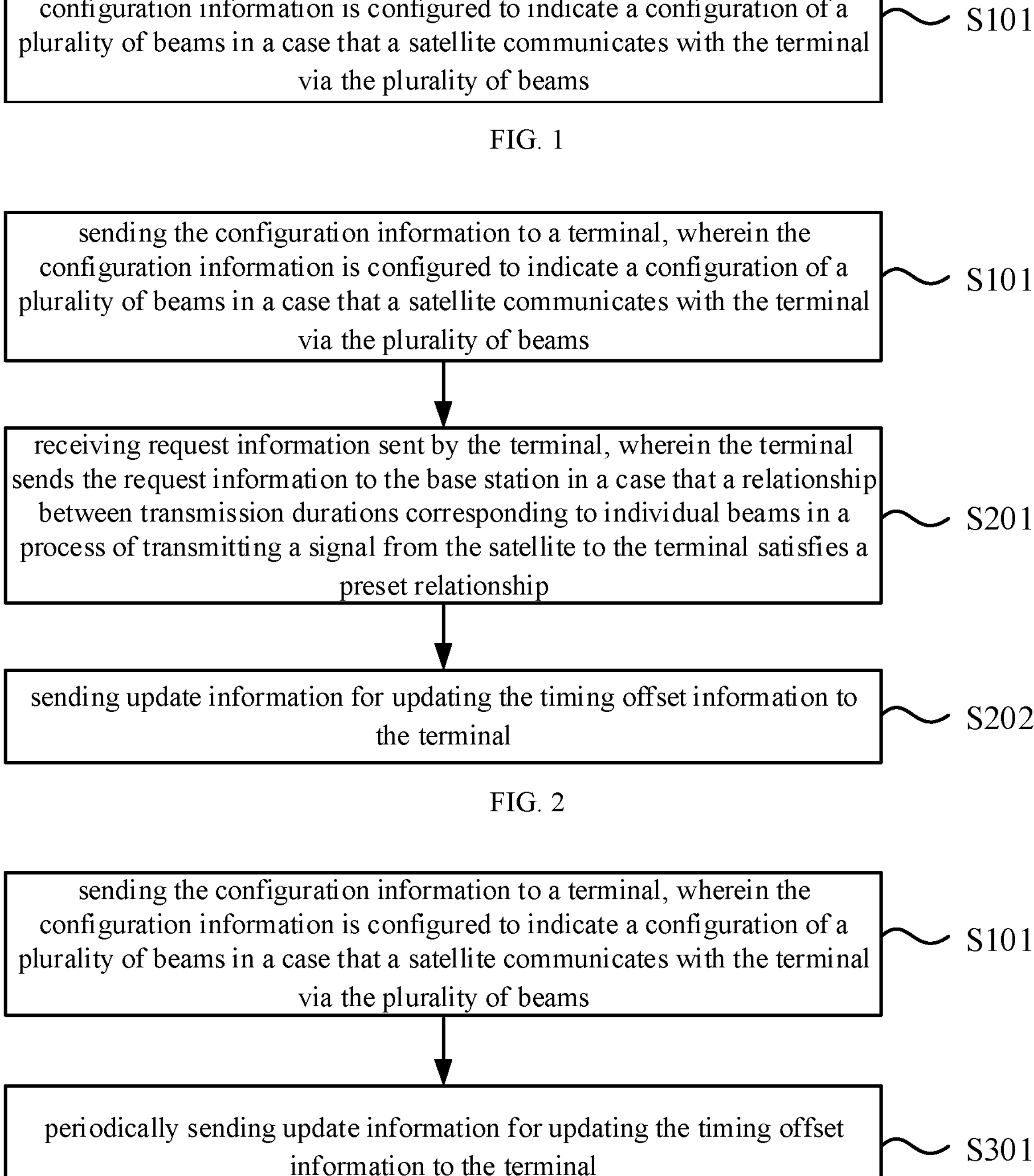
sending the configuration information to a terminal, wherein the configuration information is configured to indicate a configuration of a plurality of beams in a case that a satellite communicates with the terminal via the plurality of beams
S101
FIG. 1
sending the configuration information to a terminal, wherein the configuration information is configured to indicate a configuration of a plurality of beams in a case that a satellite communicates with the terminal via the plurality of beams
S101
receiving request information sent by the terminal, wherein the terminal sends the request information to the base station in a case that a relationship between transmission durations corresponding to individual beams in a process of transmitting a signal from the satellite to the terminal satisfies a preset relationship
S201
sending update information for updating the timing offset information to the terminal
S202
FIG. 2
sending the configuration information to a terminal, wherein the configuration information is configured to indicate a configuration of a plurality of beams in a case that a satellite communicates with the terminal via the plurality of beams
S101
periodically sending update information for updating the timing offset information to the terminal
S301
FIG. 3

METHOD FOR SENDING CONFIGURATION INFORMATION, AND METHOD FOR RECEIVING CONFIGURATION INFORMATION

CROSS-REFERENCE TO RELATED APPLICATIONS

The present application is a National Stage of International Application No. PCT/CN2021/102545, filed on Jun. 25, 2021, the contents of which are incorporated herein by reference for all purposes.

FIELD

The present disclosure relates to the field of communication technology, and particularly to a method for sending configuration information, a method for receiving configuration information, a device for sending configuration information, a device for receiving configuration information, a communication device and a computer readable storage medium.

BACKGROUND

In the non-terrestrial network (NTN), base stations may communicate with terminals via satellites, e.g. beams may be used to transmit signals between the satellites and the terminals.

In the existing communication process between the satellites and the terminals, for a single communication, the satellite generally communicates with the terminal via a single beam, and a transmission rate of the single beam is limited, for example, only up to a few tens of Mbps, and it is difficult to meet the requirements of some services requiring a higher transmission rate, for example, enhanced mobile broadband (eMBB) services.

SUMMARY

According to a first aspect of embodiments of the present disclosure, there is provided a method for sending configuration information, performed by a base station, including: sending the configuration information to a terminal, where the configuration information is configured to indicate a configuration of a plurality of beams, and the plurality of beams are used for a satellite to communicate with the terminal.

According to a second aspect of embodiments of the present disclosure, there is provided a method for receiving configuration information, performed by a terminal, including: receiving the configuration information sent by a base station; and determining a configuration of a plurality of beams based on the configuration information, where the plurality of beams are used for a satellite to communicate with the terminal.

According to a third aspect of embodiments of the present disclosure, there is provided a base station, including one or more processors configured to send the configuration information to a terminal, where the configuration information is configured to indicate a configuration of a plurality of beams, and the plurality of beams are used for a satellite to communicate with the terminal.

According to a fourth aspect of embodiments of the present disclosure, there is provided a terminal, including one or more processors configured to: receive the configuration information sent by a base station; and determine a configuration of a plurality of beams based on the configuration information, where the plurality of beams are used for a satellite to communicate with the terminal.

According to a fifth aspect of embodiments of the present disclosure, there is provided a communication device, including: a processor; and a memory for storing a computer program; where the computer program, when executed by the processor, implements the method for sending the configuration information.

According to a sixth aspect of embodiments of the present disclosure, there is provided a communication device, including: a processor; and a memory for storing a computer program; where the computer program, when executed by the processor, implements the method for receiving the configuration information.

According to a seventh aspect of embodiments of the present disclosure, there is provided a non-transitory computer readable storage medium for storing a computer program, where the computer program, when executed by a processor, implements a step in the method for sending the configuration information.

According to an eighth aspect of embodiments of the present disclosure, there is provided a non-transitory computer readable storage medium for storing a computer program, where the computer program, when executed by a processor, implements a step in the method for receiving the configuration information.

BRIEF DESCRIPTION OF THE DRAWINGS

In order to clearly illustrate technical solutions of embodiments of the present disclosure, a brief description of drawings for the embodiments is given below. The drawings in the following description only show a part of the embodiments of the present disclosure, and those skilled in the art may obtain other drawings according to these drawings without creative work.

FIG. 1 is a schematic flow chart illustrating a method for sending configuration information according to embodiments of the present disclosure.

FIG. 2 is a schematic flow chart illustrating another method for sending configuration information according to embodiments of the present disclosure.

FIG. 3 is a schematic flow chart illustrating yet another method for sending configuration information according to embodiments of the present disclosure.

DETAILED DESCRIPTION

Figures 4, 5:
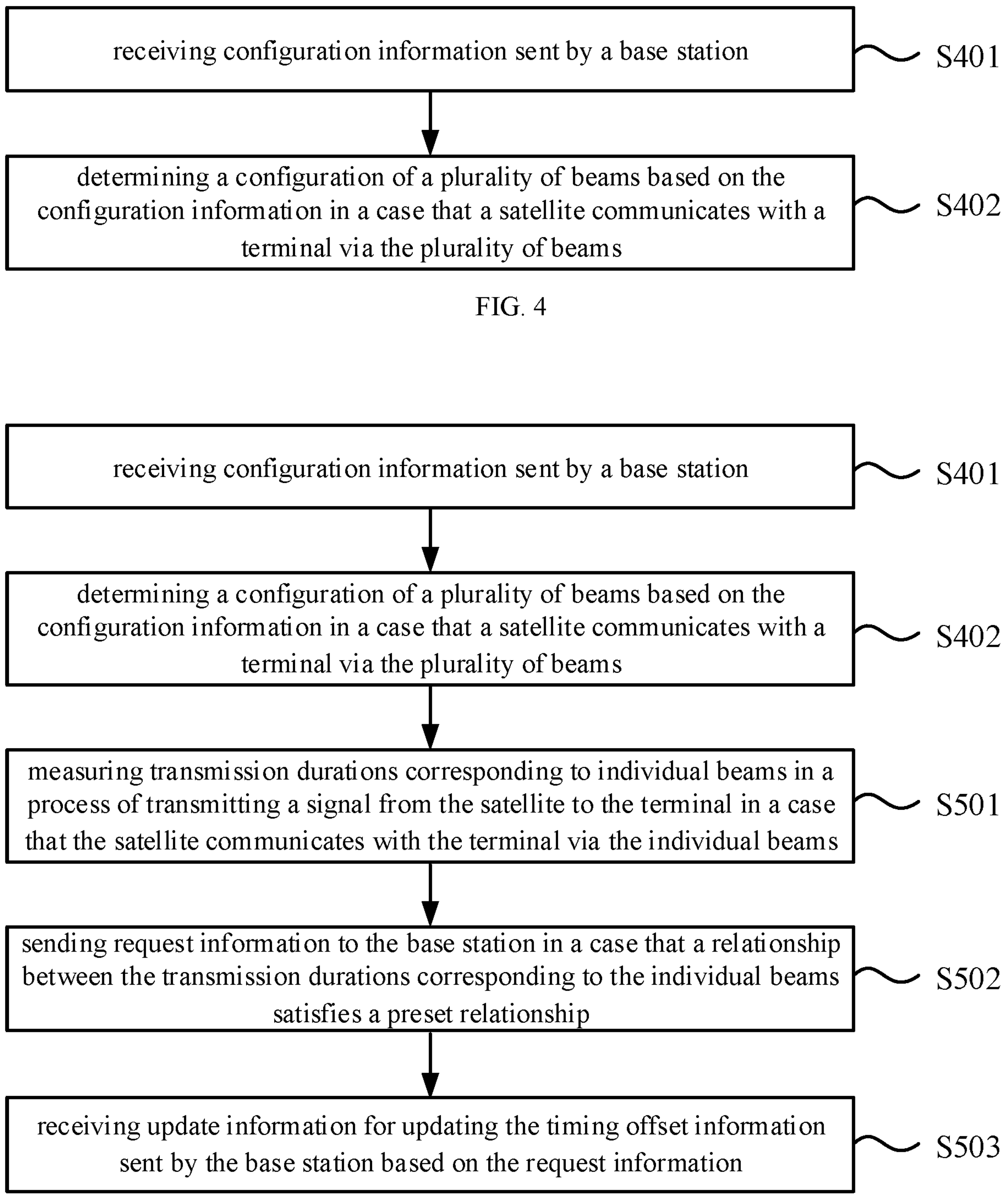
FIG. 4 is a schematic flow chart illustrating a method for receiving configuration information according to embodiments of the present disclosure.
FIG. 5 is a schematic flow chart illustrating another method for receiving configuration information according to embodiments of the present disclosure.

Reference will be made to clearly and completely describe technical solutions of the embodiments of the present disclosure with the accompanying drawings. The embodiments described herein are only a part of the embodiments of the present disclosure and are not all embodiments of the present disclosure. Based on the embodiments of the present disclosure, those skilled in the art may obtain other embodiments without creative work, and these embodiments shall be considered within the scope of the present disclosure.

Terms used in the embodiments of the present disclosure are only for the purpose of describing specific embodiments, and shall not be construed to limit the present disclosure. As used in the embodiments of the present disclosure and the appended claims, "a/an" and "the" in a singular form are intended to include plural forms, unless clearly indicated in the context otherwise. It should be understood that the term "and/or" used herein represents and contains any one of associated listed items and all possible combinations of more than one associated listed items.

It should be understood that terms such as "first," "second" and "third" may be used in the embodiments of the present disclosure for describing various information, these information should not be limited by these terms. These terms are only used for distinguishing information of the same type from others. For example, first information may also be referred to as second information, and similarly, the second information may also be referred to as the first information, without departing from the scope of the embodiments of the present disclosure. As used herein, the term "if" may be construed to mean "when" or "upon" or "in response to determining" depending on the context.

For purposes of conciseness and ease of understanding, terms "greater than" or "less than", "higher than" or "lower than" are used herein in characterizing size relationships. It may be understood for a person skilled in the art that the term "greater than" covers a meaning of "greater than or equal to", and the term "less than" covers a meaning of "less than or equal to"; the term "higher than" covers a meaning of "higher than or equal to", and the term "lower than" covers a meaning of "lower than or equal to".

FIG. 1 is a schematic flow chart illustrating a method for sending configuration information according to embodiments of the present disclosure. The method for sending the configuration information shown in the present embodiments may be applied to a base station, which may communicate with a terminal over the non-terrestrial network, for example, may communicate with the terminal via a satellite in the space, where the means for communicating via the satellite includes but is not limited to transparent transmission and non-transparent transmission (may be referred to as on-board regeneration).

In one embodiment, the terminal includes, but is not limited to, a communication device such as a mobile phone, a tablet computer, a wearable device, a sensor, an Internet of Things device, etc. The base station includes, but is not limited to, a base station in a communication system, such as a 4G base station, a 5G base station, and a 6G base station.

As shown in FIG. 1, the method for sending the configuration information may include the following step.

In S101, the configuration information is sent to the terminal, where the configuration information is configured to indicate a configuration of a plurality of beams in a case that a satellite communicates with the terminal via the plurality of beams.

In one embodiment, the base station may determine the configuration of the plurality of beams in the case that the satellite communicates with the terminal via the plurality of beams, and generate the configuration information based on the determined configuration and send it to the terminal, so that the terminal may successfully receive signals sent by the satellite via the plurality of beams based on the configuration in the configuration information, thus ensuring a good communication effect between the terminal and the satellite.

In one embodiment, the configuration includes at least one of: identification information about each of the plurality of beams; frequency domain resource information about each of the plurality of beams; service time information about each of the plurality of beams; polarization information about each of the plurality of beams; a primary service beam and a secondary service beam in the plurality of beams; or timing offset information between different beams in the plurality of beams.

In one embodiment, all or a part of the configurations may be determined independently by the satellite, or determined by the base station, or determined by negotiation between the satellite and the base station, or agreed upon a protocol.

In one embodiment, the terminal may receive the plurality of beams from the satellite when communicating with the satellite, but the satellite does not necessarily communicate with the terminal simultaneously through the plurality of beams, it may only communicate with the terminal through a beam corresponding to the identification information. The terminal may determine an identification of each of the plurality of beams when receiving the plurality of beams, for example, determining the identification of each of the plurality of beams based on a reference signal of each of the plurality of beams, and further determine a target identification belonging to the identification information. By informing the identification information about each of the plurality of beams to the terminal, the terminal may only receive a signal of the beam corresponding to the identification information sent from the satellite during the beam reception, to avoid waste of resources caused by the terminal receiving the signals of the beams which are not configured for communication with the terminal.

In one embodiment, the frequency domain resource information includes at least one of a working frequency point or a working bandwidth. Based on frequency information, the terminal may determine the working frequency point and the working bandwidth of the beam emitted by the satellite, and further receive the signal in the beam at the determined working frequency point and working bandwidth.

In one embodiment, the service time information includes at least one of a service start moment, a service end moment, or a service duration.

For example, the service time information includes the service start moment and the service end moment, indicating that the beam may start providing the service from the service start moment and stop providing the service at the service end moment, and accordingly, the terminal may receive the beam between the service start moment and the service end moment to ensure that the beam is successfully received.

For example, the service time information includes the service start moment and the service duration, indicating that the beam may start providing the service from the service start moment, and a duration for providing the service is the service duration, and accordingly, the terminal may receive the beam within the service duration from the service start moment to ensure that the beam is successfully received.

The service time information may include actual time information, and may also include logical time information, such as a system frame number, a slot sequence number, and a time domain symbol sequence number.

In one embodiment, the terminal may determine a signal coverage range (which may be understood as an angular range) of the satellite based on a primary service beam, and further receive a secondary service beam within this coverage range, and the secondary service beam may carry data for interaction.

In one embodiment, the terminal may determine a polarization mode required by the terminal to receive the corresponding beam based on the polarization information, and use the polarization mode corresponding to the beam to receive the signal of the beam. The polarization information includes at least one of linear polarization, circular polarization, left-hand polarization, or right-hand polarization.

For example, it is determined that the polarization mode of beam1 is the left-hand polarization and the polarization mode of beam2 is the right-hand polarization based on the polarization information, the terminal may receive a downlink signal sent by the satellite through beam1 in the left-hand polarization mode, and receive a downlink signal sent by the satellite through beam2 in the right-hand polarization mode, to ensure that the terminal may successfully receive the signal of every beam sent by the satellite.

In one embodiment, different beams emitted by the satellite generally have different directions, and thus the distances from the different beams to the terminal are different. Information simultaneously sent by the satellite through the different beams will arrive at the terminal at different times, and thus it is difficult for the terminal to accurately calculate a transmission delay for each of the received signals of the different beams.

Based on the timing offset information between the different beams being sent to the terminal, the terminal determines a time delay difference in the satellite transmitting the signals through the different beams. In this case, the terminal may determine a reference beam (for example, indicated by the base station or agreed in advance), the timing offset information may be a timing offset relative to the reference beam, and a time delay of the satellite transmitting the signal through the reference beam may be determined for the terminal (for example, indicated by the base station or independently calculated by the terminal in a certain manner).

For example, still taking beam1 and beam2 as an example, with beam1 as the reference beam, the timing offset information includes a timing offset between beam1 and beam2, for example, the timing offset is t21, which represents a duration between a moment when the terminal receives the signal through beam2 and a moment when the terminal receives the signal through beam1. The duration may be a positive value (representing that the signal of beam2 is received later) or a negative value (representing that the signal of beam2 is received earlier). The terminal may determine that the time delay of the satellite transmitting the signal through beam1 is T0, and may determine that the time delay of the satellite transmitting the signal through beam2 is T0+t21 based on the timing offset.

Similarly, in a case that the satellite further communicates with the terminal via beam3, and the timing offset information further includes a timing offset between beam1 and beam3, for example, the timing offset is t31. It may be determined based on the timing offset that the time delay for the satellite to transmit the signal via beam3 is T0+t31. With this process, the time delay for the satellite to transmit the signal via each of the plurality of beams may be determined.

Furthermore, the terminal may perform time domain compensation on the different beams based on the transmission delays after determining the transmission delays. For example, a timing advance (TA) may be determined based on the transmission delay, and the terminal may perform compensation for transmitting the signal to the satellite on the corresponding beam based on the timing advance. For example, a timing advance TA2 is determined according to T0+t21, and may be configured for the terminal to make compensation on the transmission to the satellite, i.e. reception of the satellite on beam2, to ensure the good communication effect between the terminal and the satellite.

In one embodiment, the timing offset information is determined at least based on a signal propagation distance in a case that the satellite communicates with the terminal via each of the plurality of beams.

The base station may determine a position of the terminal, and determine a position of the satellite based on a movement track of the satellite in a case that the satellite communicates with the terminal. Further, the signal propagation distance in each case that the satellite communicates with the terminal via each of the plurality of beams is determined according to the position of the satellite and an angle at which the satellite sends the beam, a duration of signal transmission during which the satellite communicates with the terminal via each of the plurality of beams is determined according to the signal propagation distance, and the timing offset information between the different beams is determined according to a difference between the transmission durations corresponding to the beams.

It should be noted that the timing offset information may be changeable. It is generally difficult for the terminal to accurately determine the signal propagation distance for different beams on which the satellite communicates with the terminal, but the base station may determine the signal propagation distance. With two examples provided below, updating the timing offset information by the base station is described.

FIG. 2 is a schematic flow chart illustrating another method for sending configuration information according to embodiments of the present disclosure. As shown in FIG. 2, the configuration includes the timing offset information between different beams in the plurality of beams, and the method further includes the following steps.

In S201, request information sent by the terminal is received, where the terminal sends the request information to the base station in a case that a relationship between the transmission durations corresponding to individual beams in a process of transmitting the signal from the satellite to the terminal satisfies a preset relationship.

In S202, update information for updating the timing offset information is sent to the terminal.

In one embodiment, the terminal may (e.g. periodically) detect the timing offset information after obtaining the timing offset information from the configuration information. The terminal may determine a sending time at which the satellite sends the signal and a receiving time at which the terminal receives the signal through the beam, and thus calculate the transmission duration based on the sending duration and the receiving duration.

In a case that there is little change in the position and an attitude of the satellite in the space relative to the terminal, the transmission duration remains substantially unchanged and the timing offset information remains substantially unchanged. However, in a case that there is a large change in the position or the attitude of the satellite in the space relative to the terminal, for example, a large displacement of the satellite, the transmission duration will change, resulting in a large change in the timing offset. In this case, the previously received timing offset information is not applicable, and the request information is sent to the base station.

For example, the terminal may determine whether the relationship between the transmission durations satisfies the preset relationship, satisfying the preset relationship means that a difference between the transmission durations is greater than a preset difference, or at least one transmission duration is greater than a preset duration. In this case, it may be determined that the timing offset information needs to be updated and thus the request information is sent to the base station.

After receiving the request information from the terminal, the base station may re-determine the timing offset information, generate the update information accordingly, and send the update information to the terminal, so that the terminal determines the updated timing offset information, and thus it is ensured that the terminal may perform an operation based on the accurate timing offset information.

FIG. 3 is a schematic flow chart illustrating yet another method for sending configuration information according to embodiments of the present disclosure. As shown in FIG. 3, the configuration includes the timing offset information between different beams in the plurality of beams, and the method further includes the following step.

In S301, the update information for updating the timing offset information is periodically sent to the terminal.

In one embodiment, the terminal does not need to send the request information to the base station, instead, the base station periodically sends the update information to the terminal, which is beneficial to reducing a load burden on the terminal side.

FIG. 4 is a schematic flow chart illustrating a method for receiving configuration information according to embodiments of the present disclosure. The method for receiving the configuration information shown in the present embodiment may be applied to a terminal, which may communicate with a base station in the non-terrestrial network, for example, may communicate with the base station via a satellite in the space, where the means for communicating via the satellite includes, but is not limited to, transparent transmission and non-transparent transmission (may be referred to as on-board regeneration).

In one embodiment, the terminal includes, but is not limited to, a communication device such as a mobile phone, a tablet computer, a wearable device, a sensor, an Internet of Things device, etc. The base station includes, but is not limited to, a base station in a communication system, such as a 4G base station, a 5G base station, and a 6G base station.

As shown in FIG. 4, the method for receiving the configuration information may include the following steps.

In S401, the configuration information sent by the base station is received.

In S402, the configuration of the plurality of beams is determined based on the configuration information in a case that the satellite communicates with the terminal via the plurality of beams.

In one embodiment, the base station may determine the configuration of the plurality of beams in the case that the satellite communicates with the terminal via the plurality of beams, and generate the configuration information based on the determined configuration and send it to the terminal, so that the terminal may successfully receive the signals sent by the satellite via the plurality of beams based on the configuration in the configuration information, thus ensuring a good communication effect between the terminal and the satellite.

In one embodiment, the configuration includes at least one of: identification information about each of the plurality of beams; frequency domain resource information about each of the plurality of beams; service time information about each of the plurality of beams; polarization information about each of the plurality of beams; a primary service beam and a secondary service beam in the plurality of beams; or timing offset information between different beams in the plurality of beams.

In one embodiment, all or a part of the configurations may be determined independently by the satellite, or determined by the base station, or determined by negotiation between the satellite and the base station, or agreed upon a protocol.

In one embodiment, the terminal may receive the plurality of beams from the satellite when communicating with the satellite, but the satellite does not necessarily communicate with the terminal simultaneously through the plurality of beams, it may only communicate with the terminal through a beam corresponding to the identification information. The terminal may determine an identification of each of the plurality of beams when receiving the plurality of beams, for example, determining the identification of each of the plurality of beams based on a reference signal of each of the plurality of beams, and further determine a target identification belonging to the identification information.

By informing the identification information about each of the plurality of beams to the terminal, the terminal may only receive a signal of the beam corresponding to the identification information sent from the satellite during the beam reception, to avoid waste of resources caused by the terminal receiving the signals of the beams which are not configured for communication with the terminal.

In one embodiment, the frequency domain resource information includes at least one of a working frequency point or a working bandwidth. Based on frequency information, the terminal may determine the working frequency point and the working bandwidth of the beam emitted by the satellite, and further receive the signal in the beam at the determined working frequency point and working bandwidth.

In one embodiment, the service time information includes at least one of a service start moment, a service end moment, or a service duration.

For example, the service time information includes the service start moment and the service end moment, indicating that the beam may start providing the service from the service start moment and stop providing the service at the service end moment, and accordingly, the terminal may receive the beam between the service start moment and the service end moment to ensure that the beam is successfully received.

For example, the service time information includes the service start moment and the service duration, indicating that the beam may start providing the service from the service start moment, and a duration for providing the service is the service duration, and accordingly, the terminal may receive the beam within the service duration from the service start moment to ensure that the beam is successfully received.

The service time information may include actual time information, and may also include logical time information, such as a system frame number, a slot sequence number, and a time domain symbol sequence number.

In one embodiment, the terminal may determine a signal coverage range (which may be understood as an angular range) of the satellite based on a primary service beam, and further receive a secondary service beam within this coverage range, and the secondary service beam may carry data for interaction.

In one embodiment, the terminal may determine a polarization mode required by the terminal to receive the corresponding beam based on the polarization information, and use the polarization mode corresponding to the beam to receive the signal of the beam. The polarization information includes at least one of linear polarization, circular polarization, left-hand polarization, or right-hand polarization.

For example, it is determined that the polarization mode of beam1 is the left-hand polarization and the polarization mode of beam2 is the right-hand polarization based on the polarization information, the terminal may receive a downlink signal sent by the satellite through beam1 in the left-hand polarization mode, and receive a downlink signal sent by the satellite through beam2 in the right-hand polarization mode, to ensure that the terminal may successfully receive the signal of every beam sent by the satellite.

In one embodiment, different beams emitted by the satellite generally have different directions, and thus the distances from the different beams to the terminal are different. Information simultaneously sent by the satellite through the different beams will arrive at the terminal at different times, and thus it is difficult for the terminal to accurately calculate a transmission delay for each of the received signals of the different beams.

Based on the timing offset information between the different beams being sent to the terminal, the terminal determines a time delay difference in the satellite transmitting the signals through the different beams. In this case, the terminal may determine a reference beam (for example, indicated by the base station or agreed in advance), the timing offset information may be a timing offset relative to the reference beam, and a time delay of the satellite transmitting the signal through the reference beam may be determined for the terminal (for example, indicated by the base station or independently calculated by the terminal in a certain manner).

For example, still taking beam1 and beam2 as an example, with beam1 as the reference beam, the timing offset information includes a timing offset between beam1 and beam2, for example, the timing offset is t21, which represents a duration between a moment when the terminal receives the signal through beam2 and a moment when the terminal receives the signal through beam1. The duration may be a positive value (representing that the signal of beam2 is received later) or a negative value (representing that the signal of beam2 is received earlier). The terminal may determine that the time delay of the satellite transmitting the signal through beam1 is TO, and may determine that the time delay of the satellite transmitting the signal through beam2 is T0+t21 based on the timing offset.

Similarly, in a case that the satellite further communicates with the terminal via beam3, and the timing offset information further includes a timing offset between beam1 and beam3, for example, the timing offset is t31. It may be determined based on the timing offset that the time delay for the satellite to transmit the signal via beam3 is T0+t31. With this process, the time delay for the satellite to transmit the signal via each of the plurality of beams may be determined.

Furthermore, the terminal may perform time domain compensation on the different beams based on the transmission delays after determining the transmission delays. For example, a timing advance (TA) may be determined based on the transmission delay, and the terminal may perform compensation for transmitting the signal to the satellite on the corresponding beam based on the timing advance. For example, a timing advance TA2 is determined according to T0+t21, and may be configured for the terminal to make compensation on the transmission to the satellite, i.e. reception of the satellite on beam2, to ensure the good communication effect between the terminal and the satellite.

In one embodiment, the timing offset information is determined at least based on a signal propagation distance in a case that the satellite communicates with the terminal via each of the plurality of beams.

The base station may determine a position of the terminal, and determine a position of the satellite based on a movement track of the satellite in a case that the satellite communicates with the terminal. Further, the signal propagation distance in each case that the satellite communicates with the terminal via each of the plurality of beams is determined according to the position of the satellite and an angle at which the satellite sends the beam, a duration of signal transmission during which the satellite communicates with the terminal via each of the plurality of beams is determined according to the signal propagation distance, and the timing offset information between the different beams is determined according to a difference between the transmission durations corresponding to the beams.

It should be noted that the timing offset information may be changeable. It is generally difficult for the terminal to accurately determine the signal propagation distance for different beams on which the satellite communicates with the terminal, but the base station may determine the signal propagation distance. With two examples provided below, updating the timing offset information by the base station is described.

FIG. 5 is a schematic flow chart illustrating another method for receiving configuration information according to embodiments of the present disclosure. As shown in FIG. 5, the configuration includes the timing offset information between the different beams in the plurality of beams, and the method further includes the following steps.

In S501, the transmission durations corresponding to individual beams in a process of transmitting a signal from the satellite to the terminal are measured in a case that the satellite communicates with the terminal via the individual beams.

In S502, the request information is sent to the base station in a case that a relationship between the transmission durations corresponding to the individual beams satisfies a preset relationship.

In S503, the update information for updating the timing offset information, sent by the base station based on the request information, is received.

In one embodiment, the terminal may (e.g. periodically) detect the timing offset information after obtaining the timing offset information from the configuration information. The terminal may determine a sending time at which the satellite sends the signal and a receiving time at which the terminal receives the signal through the beam, and thus calculate the transmission duration based on the sending duration and the receiving duration.

In a case that there is little change in the position and the attitude of the satellite in the space relative to the terminal, the transmission duration remains substantially unchanged and the timing offset information remains substantially unchanged. However, in a case that there is a large change in the position or the attitude of the satellite in the space relative to the terminal, for example, a large displacement of the satellite, the transmission duration will change, resulting in a large change in the timing offset. In this case, the previously received timing offset information is not applicable, and the request information is sent to the base station.

For example, the terminal may judge whether the relationship between the transmission durations satisfies the preset relationship, satisfying the preset relationship means that a difference between the transmission durations is greater than a preset difference, or at least one transmission duration is greater than a preset duration. In this case, it may be determined that the timing offset information needs to be updated and thus the request information is sent to the base station.

After receiving the request information from the terminal, the base station may re-determine the timing offset information, generate the update information accordingly, and send the update information to the terminal, so that the terminal determines the updated timing offset information, and thus it is ensured that the terminal may perform an operation based on the accurate timing offset information.

Figure 6:
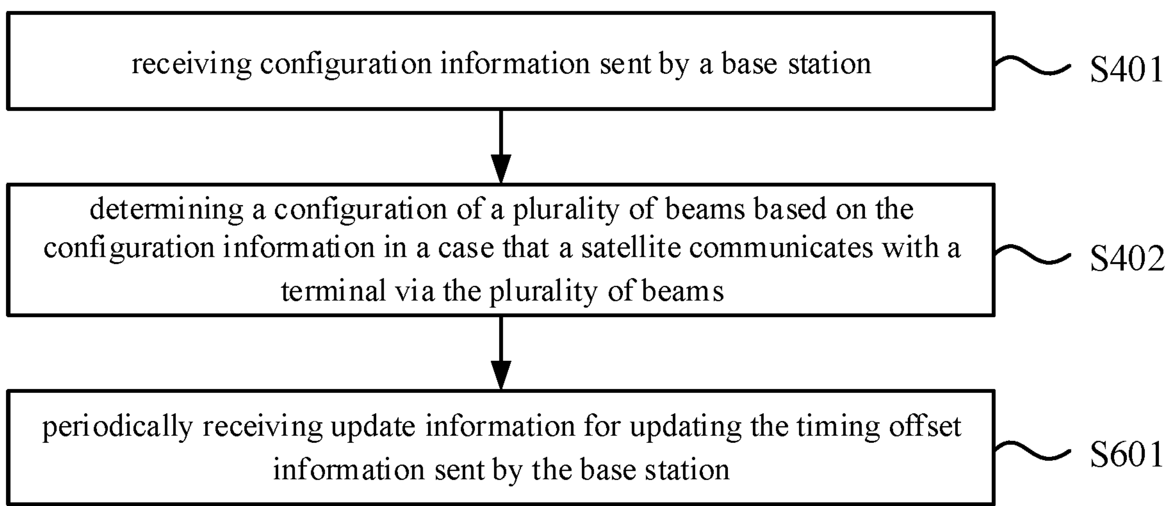
FIG. 6 is a schematic flow chart illustrating yet another method for receiving configuration information according to embodiments of the present disclosure.

FIG. 6 is a schematic flow chart illustrating yet another method for receiving configuration information according to embodiments of the present disclosure. As shown in FIG. 6, the configuration includes the timing offset information between the different beams in the plurality of beams, and the method further includes the following step.

In S601, the update information for updating the timing offset information sent by the base station is periodically received.

In one embodiment, the terminal does not need to send the request information to the base station, instead, the base station periodically sends the update information to the terminal, which is beneficial to reducing a load burden on the terminal side.

Corresponding to the foregoing embodiments of the method for sending the configuration information and the method for receiving the configuration information, the present disclosure further provides embodiments of a device for sending the configuration information and a device for receiving the configuration information.

Embodiments of the present disclosure provide the device for sending the configuration information, which may be applied to the base station, and the base station may communicate with the terminal in the non-terrestrial network, for example, may communicate with the terminal via the satellite in the space, where the means for communicating via the satellite includes, but is not limited to, the transparent transmission and the non-transparent transmission (may be referred to as the on-board regeneration).

In one embodiment, the terminal includes, but is not limited to, the communication device such as the mobile phone, the tablet computer, the wearable device, the sensor, the Internet of Things device, etc. The base station includes, but is not limited to, the base station in the communication system, such as the 4G base station, the 5G base station, and the 6G base station.

In one embodiment, the device includes one or more processors, where the one or more processors are configured to send the configuration information to the terminal, where the configuration information is configured to indicate the configuration of the plurality of beams in a case that the satellite communicates with the terminal via the plurality of beams.

In one embodiment, the configuration includes at least one of: the identification information about each of the plurality of beams; the frequency domain resource information about each of the plurality of beams; the service time information about each of the plurality of beams; the polarization information about each of the plurality of beams; the primary service beam and the secondary service beam in the plurality of beams; or the timing offset information between the different beams in the plurality of beams.

In one embodiment, the frequency domain resource information includes at least one of the working frequency point or the working bandwidth.

In one embodiment, the service time information includes at least one of the service start moment, the service end moment, or the service duration.

In one embodiment, the service time information includes the actual time information and/or the logical time information.

In one embodiment, the polarization information includes at least one of the linear polarization, the circular polarization, the left-hand polarization, or the right-hand polarization.

In one embodiment, the timing offset information is determined at least based on the signal propagation distance in a case that the satellite communicates with the terminal via each of the plurality of beams.

In one embodiment, the configuration includes the timing offset information between the different beams in the plurality of beams, and the one or more processors are configured to receive the request information sent by the terminal, where the terminal sends the request information to the base station in a case that the relationship between the transmission durations corresponding to the individual beams in the process of transmitting the signal from the satellite to the terminal satisfies the preset relationship; and to send the update information for updating the timing offset information to the terminal.

In one embodiment, the configuration includes the timing offset information between the different beams in the plurality of beams, and the one or more processors are configured to periodically send the update information for updating the timing offset information to the terminal.

Embodiments of the present disclosure further provide the device for receiving the configuration information, which may be applied to the terminal, and the terminal may communicate with the base station in the non-terrestrial network, for example, may communicate with the base station via the satellite in the space, where the means for communicating via the satellite includes, but is not limited to, the transparent transmission and the non-transparent transmission (may be referred to as the on-board regeneration).

In one embodiment, the terminal includes, but is not limited to, the communication device such as the mobile phone, the tablet computer, the wearable device, the sensor, the Internet of Things device, etc. The base station includes, but is not limited to, the base station in the communication system, such as the 4G base station, the 5G base station, and the 6G base station.

In one embodiment, the device includes one or more processors, where the one or more processors are configured to receive the configuration information sent by the base station, and determine the configuration of the plurality of beams based on the configuration information in a case that the satellite communicates with the terminal via the plurality of beams.

In one embodiment, the configuration includes at least one of: the identification information about each of the plurality of beams; the frequency domain resource information about each of the plurality of beams; the service time information about each of the plurality of beams; the polarization information about each of the plurality of beams; the primary service beam and the secondary service beam in the plurality of beams; or the timing offset information between the different beams in the plurality of beams.

In one embodiment, the frequency domain resource information includes at least one of the frequency point, or the bandwidth.

In one embodiment, the service time information includes at least one of the service start moment, the service end moment, or the service duration.

In one embodiment, the service time information includes the actual time information and/or the logical time information.

In one embodiment, the polarization information includes at least one of: the linear polarization, the circular polarization, the left-hand polarization, or the right-hand polarization.

In one embodiment, the configuration includes the timing offset information between the different beams in the plurality of beams, and the one or more processors are configured to measure the transmission durations corresponding to the individual beams in the process of transmitting the signal from the satellite to the terminal in a case that the satellite communicates with the terminal via the individual beams; to send the request information to the base station in a case that the relationship between the transmission durations corresponding to the individual beams satisfies the preset relationship; and to receive the update information for updating the timing offset information sent by the base station based on the request information.

In one embodiment, the configuration includes the timing offset information between the different beams in the plurality of beams, and the one or more processors are configured to periodically receive the update information for updating the timing offset information sent by the base station.

With respect to the devices in the above embodiments, the specific manners for performing operations for individual modules therein have been described in detail in the embodiments regarding the methods for sending/receiving the configuration information, which will not be elaborated herein.

Since the device embodiments substantially correspond to the method embodiments, reference is made to the partial description of the method embodiments. The above-described device embodiments are merely for the purpose of illustration, the modules described as separate components may be or may not be physically separated, and the components displayed as modules may be or may not be physical modules, that is, either located at one place or distributed onto a plurality of network modules. The object of embodiments of the present disclosure may be achieved by some or all of the modules in accordance with practical requirements. It would be appreciated and executable by those skilled in the art without creative efforts.

Embodiments of the present disclosure further provide a communication device, including: a processor, and a memory for storing a computer program. When the computer program is executed by the processor, the method for sending the configuration information according to any of the above embodiments is implemented.

Embodiments of the present disclosure further provide a communication device, including: a processor, and a memory for storing a computer program. When the computer program is executed by the processor, the method for receiving the configuration information according to any of the above embodiments is implemented.

Embodiments of the present disclosure further provide a computer readable storage medium for storing the computer program. When the computer program is executed by a processor, a step in the method for sending the configuration information according to any of the above embodiments is implemented.

Embodiments of the present disclosure further provide a computer readable storage medium for storing the computer program. When the computer program is executed by a processor, a step in the method for receiving the configuration information according to any of the above embodiments is implemented.

Figure 7:
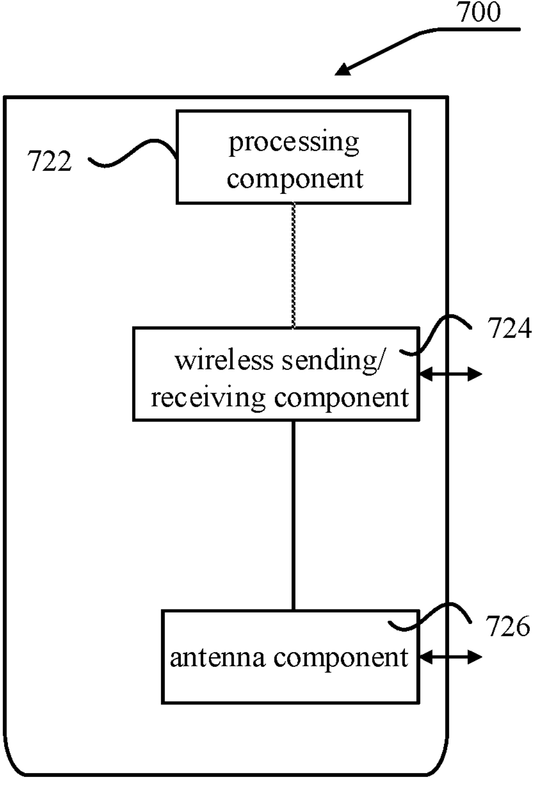
FIG. 7 is a schematic block diagram illustrating a device for sending configuration information according to embodiments of the present disclosure.

As shown in FIG. 7, FIG. 7 is a schematic block diagram illustrating a device for sending configuration information according to embodiments of the present disclosure. The device 700 may be provided as the base station. Referring to FIG. 7, the device 700 includes a processing component 722, which may further include one or more processors, a wireless sending/receiving component 724, an antenna component 726, and a signal processing portion specific to the wireless interface. One of the processors in the processing component 722 may be configured to implement the method for sending the configuration information according to any of the above embodiments.

Figure 8:
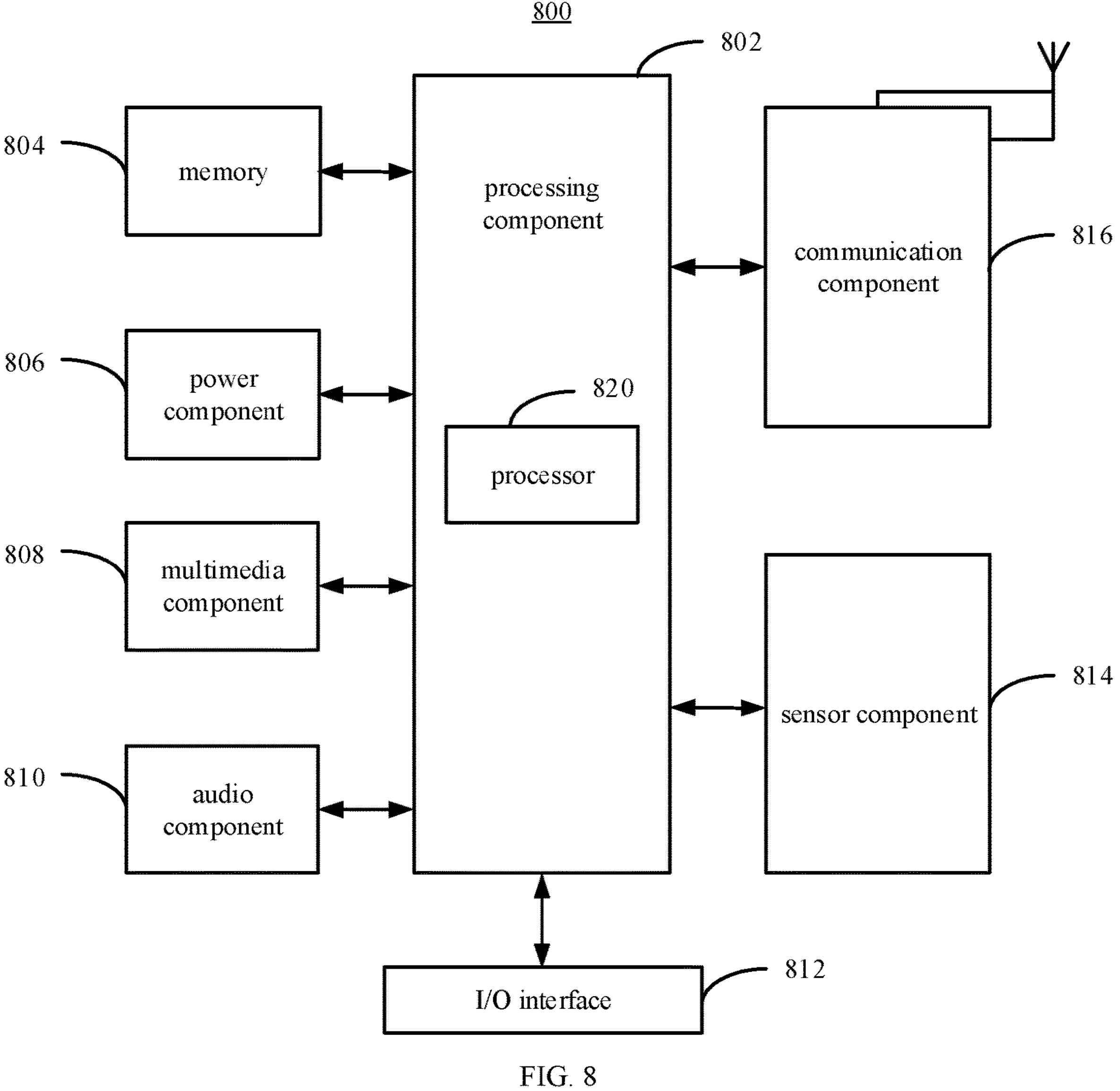
FIG. 8 is a schematic block diagram illustrating a device for receiving configuration information according to embodiments of the present disclosure.

FIG. 8 is a schematic block diagram illustrating a device for receiving configuration information according to embodiments of the present disclosure. For example, the device 800 can be a mobile phone, a computer, a digital broadcast terminal, a messaging device, a game console, a tablet device, a medical device, a fitness device, a personal digital assistant, or the like.

Referring to FIG. 8, the device 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the device 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the device 800. Examples of such data include instructions for any applications or methods operated on the device 800, contact data, phonebook data, messages, pictures, video, etc. The memory 804 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the device 800. The power component 806 may include a power management system, one or more power sources, and any other components associated with generation, management, and distribution of power in the device 800.

The multimedia component 808 includes a screen providing an output interface between the device 800 and the user. In some embodiments, the screen may include a liquid crystal display (LCD) and a touch panel (TP). When the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and/or the rear camera may receive an external multimedia datum while the device 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone (MIC) configured to receive an external audio signal when the device 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, a button and the like. The button may include, but not limited to, a home button, a volume button, a starting button, and a locking button.

The sensor component 814 includes one or more sensors to provide status assessments of various aspects of the device 800. For instance, the sensor component 814 may detect an open/closed status of the device 800, relative positioning of components, e.g., the display and the keypad, of the device 800, a change in position of the device 800 or a component of the device 800, a presence or absence of user contact with the device 800, an orientation or an acceleration/deceleration of the device 800, and a change in temperature of the device 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may further include an accelerometer sensor, a gyroscope sensor, a magnetic sensor, a pressure sensor, or a temperature sensor.

The communication component 816 is configured to facilitate communication, wired or wirelessly, between the device 800 and other devices. The device 800 can access a wireless network based on a communication standard, such as Wi-Fi, 2G, or 3G, or a combination thereof. In one embodiment, the communication component 816 receives a broadcast signal or broadcast associated information from an external broadcast management system via a broadcast channel. In one embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In embodiments, the device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In embodiments, there is further provided a non-transitory computer-readable storage medium (such as the memory 804) including instructions that, when executed by the processor 820 of the device 800, to perform any of the above-described methods. For example, the non-transitory computer-readable storage medium may be a ROM, a RAM, a CD-ROM, a magnetic tape, a floppy disc, an optical data storage device, and the like.

Other embodiments of the present disclosure will be apparent to those skilled in the art from consideration of the specification and practice of the present disclosure disclosed here. The present disclosure is intended to cover any variations, uses, or adaptations of the present disclosure following the general principles thereof and including common knowledge or conventional technical means known in the art but not disclosed in the present disclosure. The specification and examples should be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. The scope of the present disclosure is only limited by the appended claims.

It is to be noted that in this context, relational terms such as first and second are used solely to distinguish one entity or operation from another entity or operation, it does not necessarily require or imply any such actual relationship or sequence between these entities or operations. The term "comprise", "include" or any other variation thereof is intended to cover a non-exclusive inclusion, so that a process, method, article or device that includes a series of elements does not only include those elements, but also includes other elements that are not explicitly listed, or also includes elements inherent in such a process, method, article or device. Without further restrictions, an element defined by the statement "including a . . . " does not exclude the existence of another identical element in the process, method, article or device that includes the element.

The methods and devices provided by the embodiments of the present disclosure have been described in detail above, and specific examples are used to illustrate the principle and implementation of the present disclosure. The description of the above embodiments is only used to help understand the methods and core ideas of the present disclosure. At the same time, for those skilled in the art, there will be some changes in the specific implementation and application scope according to the idea of the present disclosure. In summary, the content of the specification should not be construed as a limitation on the present disclosure.

What is claimed is:

1. A method for sending configuration information, performed by a base station communicating with a terminal over a non-terrestrial network, comprising:

sending the configuration information to the terminal, wherein the configuration information indicates a configuration of a plurality of beams used for a satellite to communicate with the terminal;

wherein the configuration information comprises timing offset information between a reference beam and a non-reference beam in the plurality of beams, the timing offset information represents a duration between a moment when the terminal receives a signal through the reference beam and a moment when the terminal receives a signal through the non-reference beam, and the timing offset information and a time delay of the satellite transmitting the signal through the reference beam are used to determine a time delay of the satellite transmitting the signal through the non-reference beam;

wherein the method further comprises:

receiving request information sent by the terminal, wherein the terminal is configured to send the request information to the base station in response to determining that a relationship between transmission durations corresponding to the reference beam and the non-reference beam in a process of transmitting the signal from the satellite to the terminal satisfies a preset relationship; and sending update information for updating the timing offset information to the terminal.

2. The method according to claim 1, wherein the configuration further comprises at least one of:

identification information about each of the plurality of beams;

frequency domain resource information about each of the plurality of beams;

service time information about each of the plurality of beams;

polarization information about each of the plurality of beams; or a primary service beam and a secondary service beam in the plurality of beams.

3. The method according to claim 2, wherein the frequency domain resource information comprises at least one of a working frequency point, or a working bandwidth.

4. The method according to claim 2, wherein the service time information comprises at least one of a service start moment, a service end moment, or a service duration.

5. The method according to claim 2, wherein the service time information comprises at least one of actual time information or logical time information.

6. The method according to claim 2, wherein the polarization information comprises at least one of linear polarization, circular polarization, left-hand polarization, or right-hand polarization.

7. The method according to claim 2, wherein the timing offset information is determined based on a signal propagation distance, wherein the signal propagation distance is a distance a signal of each of the plurality of beams travels from the satellite to the terminal.

8. The method according to claim 2, further comprising:

periodically sending update information for updating the timing offset information to the terminal.

9. A method for receiving configuration information, performed by a terminal, comprising:

receiving the configuration information sent by a base station communicating with the terminal over a non-terrestrial network; and determining, based on the configuration information, a configuration of a plurality of beams used for a satellite to communicate with the terminal;

wherein the configuration information comprises timing offset information between a reference beam and a non-reference beam in the plurality of beams, the timing offset information represents a duration between a moment when the terminal receives a signal through the reference beam and a moment when the terminal receives a signal through the non-reference beam, and the timing offset information and a time delay of the satellite transmitting the signal through the reference beam are used to determine a time delay of the satellite transmitting the signal through the non-reference beam;

wherein the method further comprises:

measuring transmission durations corresponding to the reference beam and the non-reference beam in a process of transmitting the signal from the satellite to the terminal in response to determining that the satellite communicates with the terminal via the reference beam and the non-reference beam;

sending request information to the base station in response to determining that a relationship between the transmission durations corresponding to the reference beam and the non-reference beam satisfies a preset relationship; and receiving update information for updating the timing offset information sent by the base station based on the request information.

10. The method according to claim 9, wherein the configuration further comprises at least one of:

identification information about each of the plurality of beams;

frequency domain resource information about each of the plurality of beams;

service time information about each of the plurality of beams;

polarization information about each of the plurality of beams; or a primary service beam and a secondary service beam in the plurality of beams.

11. The method according to claim 10, wherein the frequency domain resource information comprises at least one of a working frequency point or a working bandwidth.

12. The method according to claim 10, wherein the service time information comprises at least one of a service start moment, a service end moment, or a service duration.

13. The method according to claim 10, wherein the service time information comprises at least one of actual time information or logical time information.

14. The method according to claim 10, wherein the polarization information comprises at least one of linear polarization, circular polarization, left-hand polarization, or right-hand polarization.

15. The method according to claim 10, further comprising:

periodically receiving update information for updating the timing offset information sent by the base station.

16. A base station communicating with a terminal over a non-terrestrial network, comprising one or more processors, wherein the one or more processors are configured to send configuration information to the terminal, wherein the configuration information indicates a configuration of a plurality of beams used for a satellite to communicate with the terminal;

wherein the configuration information comprises timing offset information between a reference beam and a non-reference beam in the plurality of beams, the timing offset information represents a duration between a moment when the terminal receives a signal through the reference beam and a moment when the terminal receives a signal through the non-reference beam, and the timing offset information and a time delay of the satellite transmitting the signal through the reference beam are used to determine a time delay of the satellite transmitting the signal through the non-reference beam;

wherein the one or more processors are further configured to:

receive request information sent by the terminal, wherein the terminal is configured to send the request information to the base station in response to determining that a relationship between transmission durations corresponding to the reference beam and the non-reference beam in a process of transmitting the signal from the satellite to the terminal satisfies a preset relationship; and send update information for updating the timing offset information to the terminal.

17. A terminal, comprising one or more processors, wherein the one or more processors are configured to perform steps of the method for receiving the configuration information according to claim 9.

18. A non-transitory computer readable storage medium for storing a computer program, wherein the computer program, when executed by a processor, implements a step in the method for sending the configuration information according to claim 1.

* * * * *